(12) United States Patent
Napier et al.

(10) Patent No.: US 7,738,995 B2
(45) Date of Patent: Jun. 15, 2010

(54) SYSTEMS AND METHODS FOR USE IN ELECTRONIC PROCESSING OF FOREIGN ORIGIN AND EXPORT SHIPMENTS AND/OR PASSENGERS AND BAGGAGE AT SECURITY CHECK POINTS

(75) Inventors: Deborah B. Napier, Prospect, KY (US); William Brent Collins, Louisville, KY (US); Angie Hutchins, Mt. Washington, KY (US); Greg Campbell, Prospect, KY (US); Terry W. Rigdon, Buckner, KY (US)

(73) Assignee: United Parcel Service of America, Inc., Atlanta, GA (US)

( * ) Notice: Subject to any disclaimer, the term of this patent is extended or adjusted under 35 U.S.C. 154(b) by 552 days.

(21) Appl. No.: 10/144,656

(22) Filed: May 13, 2002

(65) Prior Publication Data
US 2003/0167240 A1 Sep. 4, 2003

Related U.S. Application Data

(60) Provisional application No. 60/356,256, filed on Feb. 12, 2002.

(51) Int. Cl.
*G06F 7/00* (2006.01)
*G06Q 10/00* (2006.01)
(52) U.S. Cl. ........................ 700/230; 700/228; 700/226; 700/213; 705/1.1
(58) Field of Classification Search .................... 705/1, 705/5, 400, 401, 402, 404, 407, 410, 411, 705/60, 61, 62, 22, 23, 28, 29, 19, 405, 406, 705/64, 13; 378/57; 235/375, 384, 385; 198/370.01, 348; 209/535; 700/213, 225, 700/226, 228, 230; 382/100; 715/716; 707/3, 707/104.1
See application file for complete search history.

(56) References Cited

U.S. PATENT DOCUMENTS 4,832,204 A 5/1989 Handy et al.

(Continued)

FOREIGN PATENT DOCUMENTS

CA 2314495 1/2001

(Continued)

OTHER PUBLICATIONS

Trade: Custom Procedures—the First Review; Nov. 1995; Dialog, File 16, #04058266.*

(Continued)

*Primary Examiner*—Igor Borissov
(74) *Attorney, Agent, or Firm*—Alston & Bird LLP

(57) ABSTRACT

The present invention provides systems and methods for processing foreign origin parcels through Customs and individuals through security checkpoints. The system includes a database stored on a computer readable medium having data records associated with each foreign origin parcel or individual. Associated with the database is a processor having a search engine for performing searches on the information in the data records based on criteria selected by a user. The system further includes an interface. The interface allows the user to select search criteria to be used by the processor to search the data records. The interface displays the results of the search to the user and allows the user to select parcels or individuals identified during the search for inspection. In addition, the processor and interface allows the user to electronically store notes taken during the inspection, such that the information related to the inspection can be electronically archived.

33 Claims, 7 Drawing Sheets

U.S. PATENT DOCUMENTS

| | | | |
|---|---|---|---|
| 5,072,397 A * | 12/1991 | Barns-Slavin et al. | 705/400 |
| 5,072,400 A | 12/1991 | Manduley | |
| 5,072,401 A | 12/1991 | Sansone et al. | |
| 5,262,597 A | 11/1993 | Johnson, Jr. | |
| 5,284,252 A | 2/1994 | Bonnet | |
| 5,299,116 A | 3/1994 | Owens et al. | |
| 5,459,670 A | 10/1995 | Johnson et al. | |
| 5,600,303 A * | 2/1997 | Husseiny et al. | 705/1 |
| 5,684,705 A | 11/1997 | Herbert | |
| 5,787,400 A | 7/1998 | Weber | |
| 5,793,639 A * | 8/1998 | Yamazaki | 700/226 |
| 5,818,897 A * | 10/1998 | Gordon | 378/19 |
| 5,870,711 A * | 2/1999 | Huffman | 705/8 |
| 5,896,999 A | 4/1999 | Bonnet | |
| 5,915,730 A | 6/1999 | Petkovsek | |
| 5,971,587 A | 10/1999 | Kato et al. | |
| 5,974,111 A * | 10/1999 | Krug et al. | 378/57 |
| 6,029,155 A | 2/2000 | Bass et al. | |
| 6,158,658 A * | 12/2000 | Barclay | 235/384 |
| 6,203,068 B1 | 3/2001 | Petkovsek | |
| 6,208,910 B1 | 3/2001 | Michael et al. | |
| 6,218,943 B1 | 4/2001 | Ellenbogen | |
| 6,220,509 B1 | 4/2001 | Byford | |
| 6,230,872 B1 | 5/2001 | Huang et al. | |
| 6,285,916 B1 | 9/2001 | Kadaba et al. | |
| 6,332,098 B2 | 12/2001 | Ross et al. | |
| 6,839,403 B1 * | 1/2005 | Kotowski et al. | 378/57 |
| 7,012,256 B1 * | 3/2006 | Roos et al. | 250/359.1 |
| 2001/0035410 A1 | 11/2001 | Taube et al. | |
| 2002/0082956 A1 * | 6/2002 | Peterson et al. | 705/28 |
| 2002/0087526 A1 * | 7/2002 | Rao | 707/3 |
| 2002/0120561 A1 * | 8/2002 | Chin et al. | 705/38 |
| 2002/0129094 A1 * | 9/2002 | Reisman | 709/203 |
| 2002/0154157 A1 * | 10/2002 | Sherr et al. | 345/716 |
| 2002/0176531 A1 * | 11/2002 | McClelland et al. | 378/57 |
| 2002/0176532 A1 * | 11/2002 | McClelland et al. | 378/57 |
| 2002/0186862 A1 * | 12/2002 | McClelland et al. | 382/100 |
| 2003/0084033 A1 * | 5/2003 | Hays et al. | 707/3 |
| 2004/0118907 A1 * | 6/2004 | Rosenbaum et al. | 235/375 |

FOREIGN PATENT DOCUMENTS

| | | |
|---|---|---|
| JP | 11045267 A | 2/1999 |
| JP | 200084532 A | 3/2000 |
| JP | 200148352 A | 2/2001 |
| JP | 2001330832 A | 7/2001 |
| JP | 2001344276 A | 12/2001 |
| JP | 200214044 A | 1/2002 |

OTHER PUBLICATIONS

International Search Report, PCT/US02/25543, mailed Apr. 8, 2003.
U.S. Appl. No. 60/281,068, McClelland et al.
Yoshio Majima, "Practice of global logistics (18): Centered on trade logistics," Material Flow, Ryuken Co. Ltd, Aug. 1, 2001, vol. 42, No. 8, pp. 65-67.
References cited from Japanese Office Action dated May 30, 2007.
Concise Explanation of the Relevance of Cited Non-English Document.
Translation of Japanese Office Action.
Art cited from attached Canadian Office Action dated Jun. 22, 2007.
Art cited from attached Office Action for the corresponding Japanese Patent Application No. 2003-568554 mailed Dec. 21, 2007.
Office Action from corresponding Canadian Application Serial No. 2 637 716 dated Feb. 10, 2010.

* cited by examiner

SYSTEMS AND METHODS FOR USE IN ELECTRONIC PROCESSING OF FOREIGN ORIGIN AND EXPORT SHIPMENTS AND/OR PASSENGERS AND BAGGAGE AT SECURITY CHECK POINTS

CROSS-REFERENCE TO RELATED APPLICATIONS

The present application claims priority from U.S. Provisional Patent Application Ser. No. 60/356,256, entitled: System and Methods for Use in Electronic Processing of Foreign Origin Parcels filed on Feb. 12, 2002, the contents of which are incorporated herein by reference.

FIELD OF THE INVENTION

The present invention provides systems and methods for electronically processing of information concerning foreign origin and export parcels and/or passengers and more specifically, relates to electronic processing of parcels for import or export inspection or processing of passengers and baggage at security check points.

BACKGROUND OF THE INVENTION

In many large parcel delivery systems, thousands of parcels are shipped every day from thousands of departure locations, routed to central hubs, and then redistributed and delivered to thousands of delivery locations. In many cases, parcels have committed delivery times, which can range from a few days to overnight delivery. For most parcel delivery companies, automation and electronic transmission and storage of information related to the parcels is a vital factor in processing and delivering parcels within shipment deadlines.

One area where automation has historically been a problem, however, is in the shipment of foreign origin parcels. Specifically, most of these parcels are subject to Customs regulations. This means that each parcel must be evaluated to determine whether Customs inspection is necessary. If inspection is necessary, the parcel must be routed to the Customs department in the hub for inspection prior to release for delivery. One problem is that the foreign origin parcels must be physically segregated from the domestic parcels prior to inspection. This typically requires that the parcel delivery company maintain a separate area for processing foreign origin parcels separate from its area for processing domestic parcels.

Another problem is that procedures for selecting shipments to be inspected and input of information concerning Customs' inspections have been mainly a manual operation. Given the fact, that as many as 100,000 foreign origin parcels may be processed through a hub on any given day, the delays caused by manual selection, routing, and reporting on Customs' inspections can jeopardize, if not delay shipping deadlines for these parcels.

FIGS. 1 and 2 provide a general illustration 10 of the conventional procedures used to process foreign origin parcels. When a shipment from a sender containing one or several parcels is originally provided to a parcel delivery company at a shipment location 12, information related to the shipment and each parcel in the shipment is stored electronically in data files. (See step 100). The information, once entered; is then transmitted to a central management system 14 at a central departure location 16. (See step 102). The shipments within the geographic area surrounding the departure location 16 are assimilated and transported to a central hub 18 by means of aircraft 20, ship, truck, or otherwise.

Importantly, as the shipments are of foreign origin many of them are subject to payment of duties and other taxes and also subject to Customs laws. For example, some of the shipments are considered imports as they are of foreign origin and are bound for delivery in the country where the central hub is located. Import shipments are typically subject to both duty taxes and Customs inspection. Other shipments are referred to as in-transit shipments. These are shipments that are merely passing through the central hub on their way to delivery in another country. For example, the shipment may have departed England for delivery in Mexico, but was processed in the U.S. during delivery. In-transit shipments are typically subject to Customs laws but not to duties.

With reference to FIGS. 1 and 2, to speed processing of these shipments through brokerage and Customs, the data 22 associated with each shipment and each parcel in each shipment is typically transmitted ahead of the shipment to the central hub, where the shipment is to be processed and sorted for delivery. (See step 104). The data is transmitted and stored in the hub management system 28. At the central hub 18, information 24 for import shipments is provided from the hub management system 28 to a brokerage system 26. (See step 106). The brokerage system is used by individual brokers to assess duties and other taxes for each import parcel in an import shipment. The brokers add to the information 24 and transmit the information back to the hub management system 28. Following brokerage, information related to the import shipments, as well as the in-transit shipments, is made available to Customs 32 for determination of which shipments and which parcels of the shipment will be inspected when they arrive. (See step 108). It is at this point that severe time delays and inefficiency may be introduced into the system.

Specifically, with reference to FIG. 1, the brokerage system generates a hard copy of the information related to the foreign origin parcels. This printout is generally referred to as the manifest. The manifest includes information such as delivery address, shipment priority, weight, size, etc. for each parcel in an import and in-transit shipment. The manifest 30 is provided to Customs 32. (See step 108). Customs manually reviews the manifest and selects shipments or individual parcels from a shipment that they wish to inspect. The marked up copy of the manifest 34 is then provided to a user, which inputs the selections to the hub management system 28. (See step 110). Shipments having parcels selected for inspection are given a "hold" status.

After Customs has selected parcels from shipments for inspection, the shipments are then available for sorting at the hub. Specifically, in these conventional systems, foreign origin shipments are processed in a designated area apart from the domestic shipments. During unload and sorting, shipments having parcels selected for inspection are taken to a holding area, not shown. Parcels from the shipments selected for inspection are then manually routed to Customs 32 for inspection. (See step 114). The remaining shipments not having parcels selected for inspection are placed on the conveyor system 36 and sorted for delivery. (See step 112).

With reference to FIG. 1, when the parcels are routed to Customs, the Custom inspector is provided with a second hard copy manifest 38 containing information about the shipments and individual parcels selected for inspection. (See step 116). During the inspection process, the Customs inspector inspects the parcels and makes written notations concerning the inspection directly on the hard copy of the manifest 38 providing a marked up manifest 40. (See step 118). After inspection, the Customs inspector determines whether the parcels should be released, held, or confiscated. These notations are made on the marked up copy of the manifest 40. This marked up copy 40 is then used to manually update the status registers associated with each parcel in the hub management system 28. (See step 120). Shipments containing parcels that have been inspected and released are placed on the sort and conveyor system 36 and sorted for delivery, while shipments containing parcels that are either held or confiscated by Customs are warehoused or otherwise retained. (See step 122).

Importantly, with reference to FIG. 1, the marked up manifests 34 and 40 are both retained as a history of the Customs inspection. (See step 124). The marked up manifest 34 provides proof of presentation of the parcels to Customs, and the marked up manifest 40 provides proof of inspection by Customs. The hardcopies are placed in a physical filing system 42, such as warehouse, and retained for an extended period of time.

As can be seen from FIGS. 1 and 2, conventional systems for processing and inspecting foreign origin parcels have significant drawbacks. They are prone to time delay and human error, as they require Customs inspectors to manually view all of the data from the foreign origin parcels in paper form and select from this manual inspection, parcels for inspection. Further, these conventional procedures require physical storage of the marked up manifests for record keeping. Physical storage and information retrieval can become a problem. Specifically, U.S. Customs requires retention for at least five years. Additionally, physical storage of paper copies of the inspection does not allow for easy retrieval of data or electronic searches of the data and is also not conducive to generation of reports concerning the inspection. Thus, in an industry where minimizing time delay in the shipment of parcels is a must, the current system for processing and inspection of foreign origin parcels is disadvantageous.

As also noted above, in conventional parcel delivery systems, the foreign origin shipments are typically segregated from domestic shipments. This requires separate handing and sorting systems for both types of shipments. The requirement for separate systems requires not only added cost in equipment, but also added plant space and real estate. Also, most conventional sorting systems still require manual sorting of parcels based on destination for delivery.

To this last point, United Parcel Service™ (UPS) is currently implementing an automated sortation system for sorting parcels. This new system uses information associated with the parcel, such as delivery address, shipment priority, weight, size, etc., to effectively route the parcel to its proper destination. When parcels are delivered to the central hub, a series of conveyor belts and other processing machinery read information concerning the parcels that is stored in bar codes on the parcel and stored in the automated sorting and conveyor system. The automated system distributes the parcels to proper bins, pallets, etc. where they are then loaded with other parcels having delivery locations in the same geographic area, and then shipped for delivery.

Given the advantages of this newly designed automated system, it would be advantageous to incorporate the processing of the foreign origin parcels into this system. Specifically, it would be advantageous to allow both domestic and foreign shipments to be processed on the same sortation system, with foreign origin shipments selected for inspection being routed to inspection using the system and routed for delivery after inspection is complete.

In addition to the need to expedite inspection of import shipments, there are also issues with exports. Specifically, there are considerable limitations on the export of goods. Some of these relate to the goods themselves, such as certain agriculture products, encrypted software, etc. Further, some issues relate to destinations for exports. There are restrictions on export of goods to certain countries and to certain individuals and entities. In light of this, close inspection of exports is typically required by various governmental agencies from Agriculture to the Department of Justice. As with imports, most inspection of exports is performed manually using data printouts, and inspection notes are handwritten. As such, similar to the issues with imports, more reliable and efficient means for inspection of exports is needed.

In addition to the need to expedite inspection of shipments, there is also an emerging need for increased inspection of items, people, etc. entering the country. Specifically, there has been a recent increase in many security measures, especially those related to air travel and package shipping, both foreign and domestic. As discussed above, with regard to import and intransit shipments, all information is currently handled in paper form. It would be advantageous to provide electronic information that could be searched based on criteria to identify shipments that may pose a security threat. Similarly, there has been a significant increase in transportation security for airports, bus lines, and trains. Many security measures are directed at point or origin of passengers, passengers' citizenship, etc. There are needs in this area for mechanisms that allow for electronic searches of passenger information.

SUMMARY OF THE INVENTION

The present invention remedies these and other problems by providing systems and methods for processing foreign origin shipments. Specifically, the present invention provides systems and methods that electronically store data associated with each parcel for each foreign origin shipment. The systems and methods of the present invention allow users to perform electronic searches on the data using selected search criteria. These search criteria can be one or a combination of the data associated with each parcel of a foreign origin shipment. For example, the search could be for shipments designated for delivery within a certain geographic location and above a selected weight. Shipments meeting the criteria selected by the user are displayed to the user electronically. Using this electronic display, the user can select parcels for inspection and release for delivery the remaining shipments having parcels that were not selected. After selection of parcels for inspection, the systems and methods of the present invention route the shipment containing the parcels to a location for inspection. If all of the parcels in a shipment are not selected, the non-selected parcels of the shipment are retained, while the selected parcels are inspected.

During inspection, the systems and methods of the present invention provide an electronic display of the data associated with the shipment and the parcels of the shipment selected for inspection. The systems and methods of the present invention allow the user to electronically input information related to the inspection of the parcels. This information is stored electronically and can be archived, searched, and manipulated for reports. Further, the systems and methods of the present invention allow the user to alter the status of shipments having parcels held for inspection following inspection so that the shipments can be electronically released for shipment or held for further inspection or confiscation.

Importantly, the present invention provides systems and methods that allow a user to view data concerning shipments and each parcel in the shipment electronically and run electronic searches on the data. This, in turn, reduces the time required for the user to manually view data for each parcel in a shipment in order to select parcels for inspection. Further, it provides greater reliability in parcel selection, as the electronic search will flag parcels that may be missed during a manual search of the data. In addition, the systems and methods of the present invention allow a user to electronically select parcels for inspection and release shipments having unselected parcels electronically. This lessens the delay in the selection process and also reduces errors from manual input of the selections and releases from a hard copy of the manifest.

The systems and methods of the present invention also allow the user to electronically store and archive data concerning inspections. This alleviates problems with physical storage and retrieval of hard copies and also allows for electronic search and retrieval of the data for generating reports.

The systems and methods of the present invention are also useful in implementation of new automated sort systems. Specifically, the systems and methods of the present invention allow one sortation system to sort both foreign origin and domestic shipments. The systems and methods of the present invention first place a hold on all shipments prior to selection of parcels for inspection. After selections have been made, foreign origin shipments not having parcels selected for inspection can be sorted for delivery along with the domestic shipments, while shipments having parcels selected for inspection can be routed to holding areas. Furthermore, shipments that have cleared inspection can be sorted for delivery merely by changing the status flag from "inspect" to "release" and placing the shipment on the automated sort system.

As an example of the present invention, in one embodiment, a system for processing foreign origin shipments is provided. The system includes a database stored on a computer readable medium having data records containing information for each foreign origin shipment and each parcel in the shipment. Associated with the database is a processor having a search engine for performing searches on the information in the data records of the database using criteria selected by a user. The system further includes an interface associated with the processor. The interface allows a user to select search criteria used by the processor to search the data records. Further, the interface displays the results of a search to the user and allows the user to select parcels identified during a search.

In some embodiments, the system of the present invention allows a user to create an electronic manifest for the parcels selected for inspection. In this embodiment, the processor creates a data file in the database containing a list of the shipments and parcels within the shipment selected by the user. The processor also stores information associated with each selected parcel retrieved from the data records for the parcels stored in the database. The processor accesses this data file and displays on the interface an electronic manifest of the shipments and parcels selected for inspection.

As mentioned, the present invention also allows the user to electronically change the status associated with the parcels. Specifically, in one embodiment, each data record in the database includes status information associated with each parcel. The status information indicates either a "hold" status for the shipment or a "release" status for the shipment. Prior to selection of parcels by the user for inspection, the status of each shipment is set to "hold." After selection of parcels for inspection, the processor of the present invention alters the status flags associated with the shipments having no parcels selected to a "release" status, so that the unselected shipments can be released during sorting for delivery. In addition, after the user has inspected the selected parcels, the processor of the present invention allows the user, via the interface, to alter the status of the shipment containing the inspected parcels to "release," so that the shipment can be sorted for delivery by the sorting system.

As discussed above, the system of the present invention allows the user to select criteria and search the data associated with each parcel during the parcel selection process. In some embodiments, it is advantageous to allow the user to run test searches on the data, such that the user accesses the number and types of parcels that may be returned by the search. For example, the user may wish to determine the number of parcels that will be found by the search so that the user can either broaden or further limit the search. In these instances, the interface of the present invention allows the user to perform preliminary tests on the information associated with each parcel by selecting different search criteria in a test mode. In this test mode, the processor of the present invention, using the search engine, searches the data for the parcels based on the search criteria and displays the results of the search to the user. After the user has selected desired criteria to be used during the actual selection process, the interface of the present invention allows the user to store the resulting desired search criteria determined during the test mode. These selected search criteria are then used by the processor in normal operation to search the information and display results to the user for purposes of inspection.

In some embodiments, the system of the present invention is used by various users to select search criteria and choose parcels for inspection. In this embodiment, each of the users has a unique identification code. The interface and processor of the present invention allow each user to select individual search criteria. The processor stores the search criteria selected by a user along with the user's identification code. During operation, the processor, using the search engine, searches the data records of the database using the search criteria selected by each user and stores in separate files in the database the results of each search along with the user's identification code. Further, the processor and interface allow the user to access the search results associated with the user's identification code and allows the user to select parcels from the search results for inspection. The processor creates a manifest data file for display on the interface containing a list of shipments and the parcels selected in the shipments by the user and the information associated with each selected parcel to thereby provide an electronic manifest for each user of the parcels selected for inspection by the user.

In embodiments of the system in which there are multiple users, each of the users may have a selected location in the hub where they perform physical inspections of parcels. In this instance, the database may further include a sort location stored in the database along with the user's unique identification code. In this embodiment, after each user has selected parcels for inspection, the automated sorting system of the present invention uses the user identification code to route the parcels selected by the user to the user's location for inspection.

The processor and interface of the present invention may also provide a supervisory status window for use in monitoring the status of the users. Specifically, in this embodiment, the processor displays to the interface a report including each user's identification code, the inspection location of the user, the number of shipments selected for inspection by the user, and other related data.

The systems and methods of the present invention can be implemented with any larger parcel delivery management system to manage processing of foreign origin shipments. Provided below is one example of the implementation of the systems and methods of the present invention in a large parcel delivery system. Specifically, in this embodiment, the parcel delivery system includes an acquisition data management system having a database for receiving and storing in data files information related to foreign origin shipments as the shipments are submitted for delivery. The parcel delivery system further includes a broker data management system having a database for receiving and storing data records for each shipment from the hub management system. The broker data management system provides information concerning each parcel to a broker who at a minimum may assess fees for importation of each parcel.

Importantly, associated with the broker data management system is a Customs processing system for use in performing Customs inspections of foreign origin parcels. The Customs processing system includes a database for receiving and storing data files for each shipment from the acquisition data management system. A processor is associated with the database having a search engine for performing searches on the information in the data records based on criteria selected by a user. Further, there is an interface associated with the processor. The interface allows a user to select search criteria used by the processor to search the data records and displays the results of a search to the user. The interface also allows the user to select parcels identified during a search for inspection. The processor, via the interface, provides an electronic manifest including information related to the parcels selected for inspection. The processor also allows the user to store electronically notes concerning the inspection and release shipments containing parcels selected for inspection.

Importantly, the parcel delivery system further includes an at least partially automated sorting management system. The sorting management system receives each of the shipments and routes shipments having "release" status flags to outbound load stations for delivery and routes shipments having "hold" status flags to a Customs' inspection area for inspection.

The present invention also provides systems and methods for inspecting export shipments. Specifically, as mentioned above, when a shipment is provided to a parcel delivery service for shipment, several items of information concerning the shipment is entered electronically. This information may, for example, include the departure and destination, the sender, the receiver, the type of goods in the shipment, i.e., agriculture products, encrypted data, etc. Importantly, the systems and methods of the present invention allow a user to perform electronic searches on the export data using selected search criteria. Export shipments uncovered from the search can then be viewed electronically by the user. The user can electronically select export shipments and individual parcels in the shipments for further inspection, confiscation, etc. The user can also store electronic notes concerning the inspection.

In addition to providing systems for use in the selection and inspection of foreign origin and export shipments, the systems and methods of the present invention can also be implemented as security measures in the transportation industry to aid in selection of passengers and/or luggage for inspection. Specifically, in this embodiment, information related to each passenger is stored in a database. This date may include characteristics of the passenger such as gender, ethnicity, citizenship, etc. It will also include information such as departure and destination, cost of ticket, how the ticket was purchased, when the ticket was purchased, and where the ticket was purchased.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is a graphical illustration of the information displayed to a user during the selection of criteria for searching the information associated with each parcel according to one embodiment of the present invention.

FIG. 6 is a graphical illustration of the information displayed to a user indicating the results from a search of the information associated with parcels according to one embodiment of the present invention.

FIG. 7 is a graphical illustration of a manifest displayed to a user for use in selecting parcels for inspection according to one embodiment of the present invention.

DETAILED DESCRIPTION OF THE INVENTION

Figure 1:
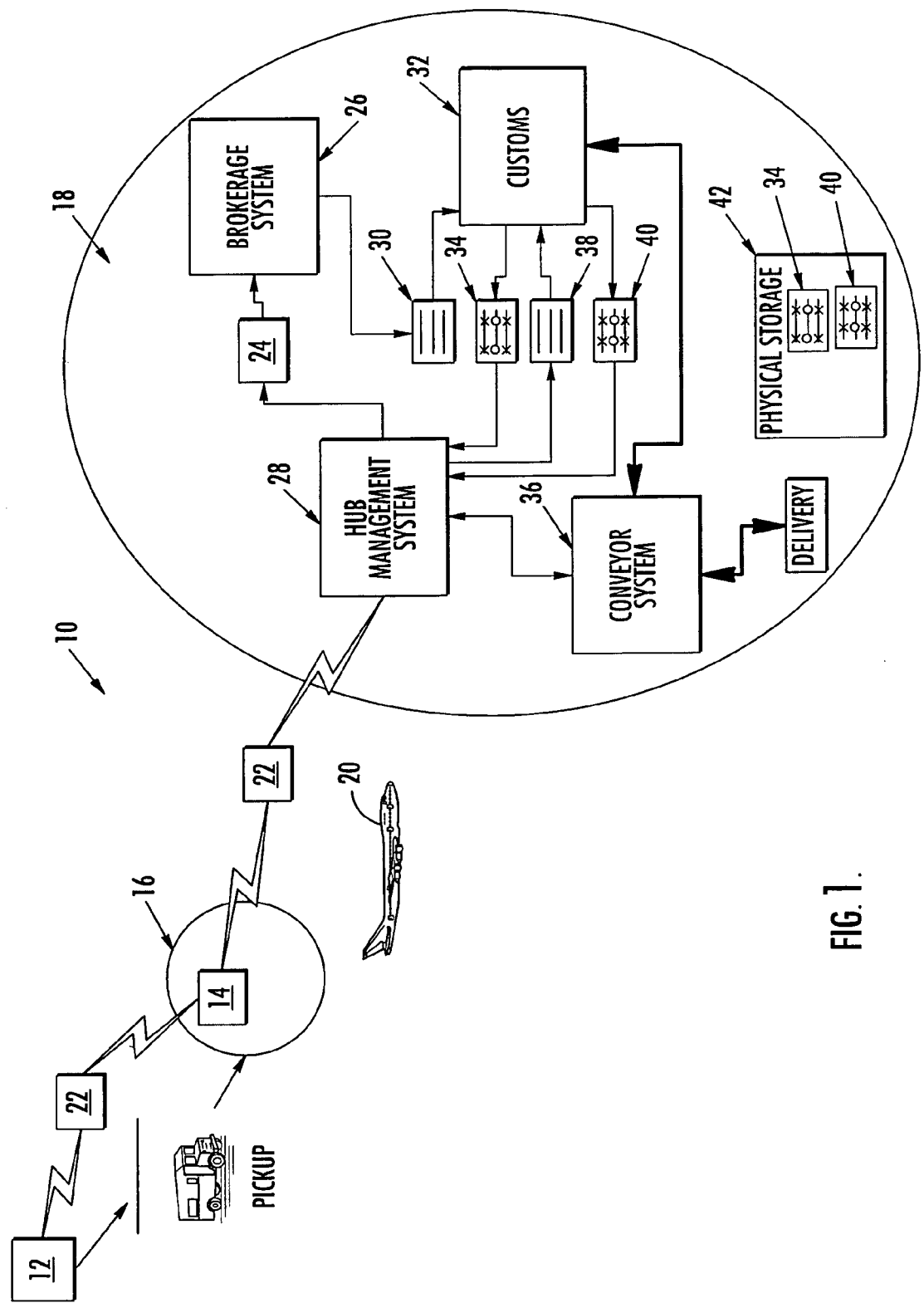
FIG. 1 is a generalized graphical illustration of a conventional system for processing foreign origin parcels.
Figure 2:
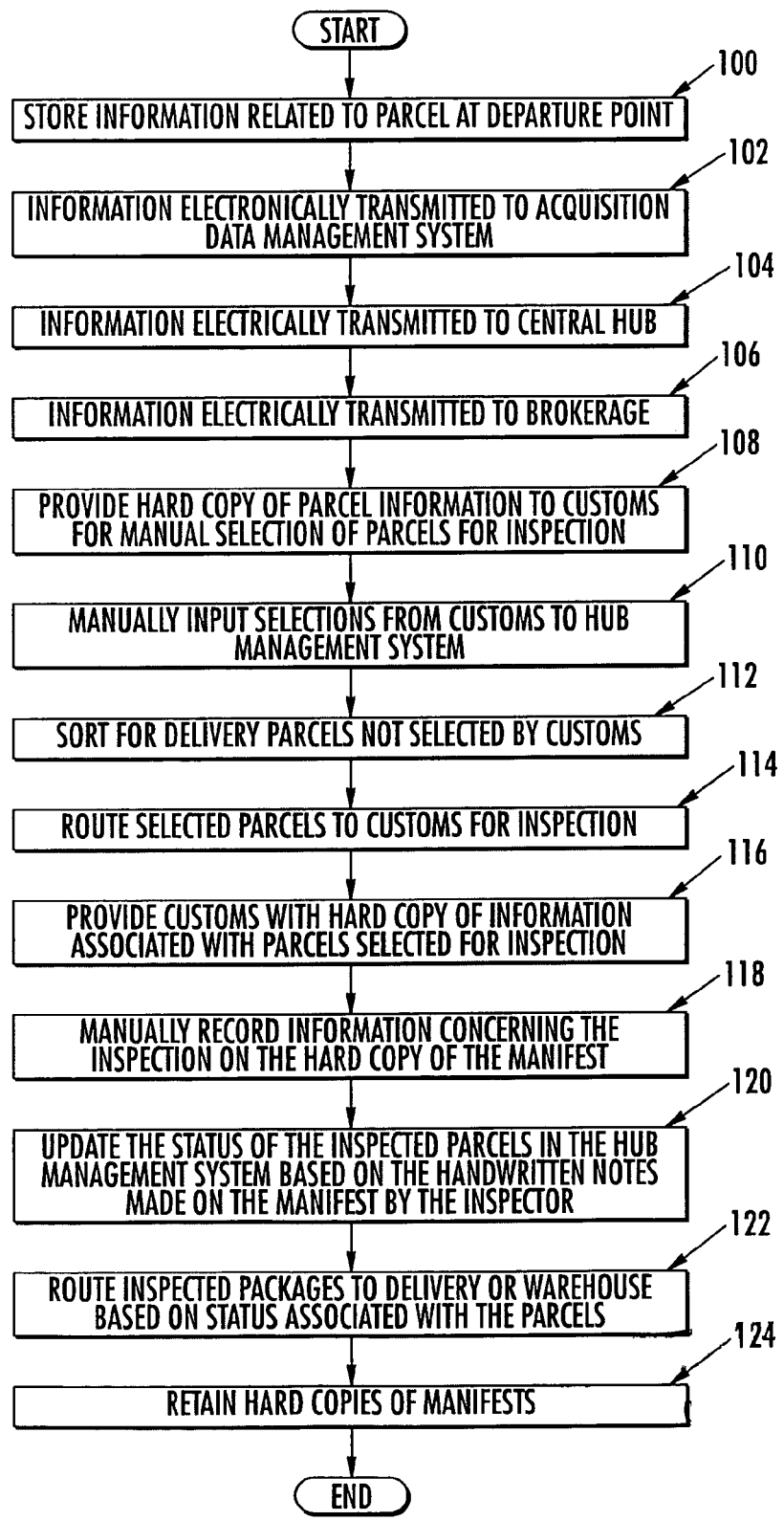
FIG. 2 is a generalized block diagram of the conventional operations used for processing foreign origin parcels.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As provided in greater detail below, the present invention provides several systems and methods for use in shipping and security inspections. Specifically, the systems and methods of the present invention allow electronic searches to be performed on parcels in the shipment application and passengers or attendees in a security application. The electronic searches allow a user to select certain criteria based on the types of parcels in the case of shipment applications and passengers or attendees in a security application that they wish to further inspect. The systems and method of the present invention further allow for electronic storage of notes from the search and electronic storage of records for later use.

For example, in the case of shipment inspections, the present invention allows a user to select search criteria and run an electronic search on information stored electronically and associated with parcels in a shipment. The search is used to identify parcels for potential inspection. From this electronic search, the systems and methods of the present invention provide the user with a list or manifest of parcels meeting the search criteria. The user then electronically selects parcels from the list for inspection. Further, the systems and methods of the present invention allow the user to electronically store data related to inspections performed on selected parcels for purposes of archiving, electronic searching, and generation of reports. The different aspects of the systems and methods of the present invention are discussed in turn below with a description of the use of the invention in a shipment application and a security application.

As an initial matter, the word "parcel" is used interchangeably throughout with the word package and broadly includes any item handled by a delivery service, such as packages, letters, containers, or unpacked items. Further, the term shipment is used to represent either one or several parcels shipped by the same individual or entity at the same time to the same destination. The term "imports" and "import parcels" refer to foreign origin parcels designated for delivery in the county, and the term "in-transits" and "in-transit parcels" refer to parcels that are from a foreign origin and designated for delivery in another foreign country but are routed through the present country.

It is understood that the systems and methods of the present invention may be implemented in any parcel delivery system. To provide a more complete understanding of the present invention, however, the systems and methods of the present invention are illustrated below for use in a specific delivery system. In light of this, some of the features of the present invention are implemented in the embodiments below to meet some of the specifics of the example parcel delivery system. It is understood, however, that this only for the purpose of providing disclosure of the present invention and should not limit the scope of the invention.

Further, the description below discusses shipments and individual parcels in shipments. It must be understood that the present invention can be used for all different types of shipments, from general packages to more cargo oriented shipments.

Figure 3:
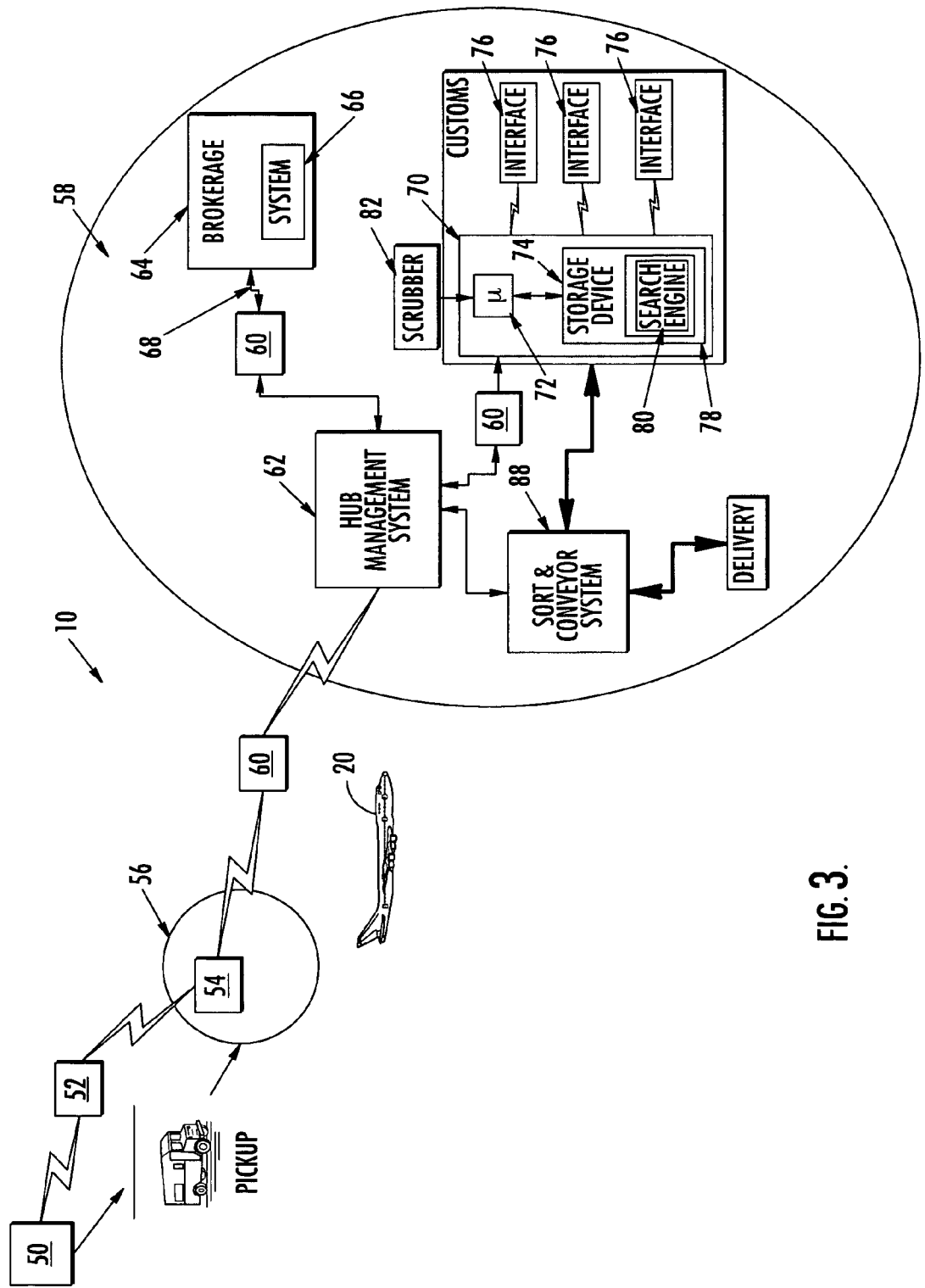
FIG. 3 is a generalized graphical illustration of a system according to one embodiment of the present invention for processing foreign origin parcels.
Figure 4:
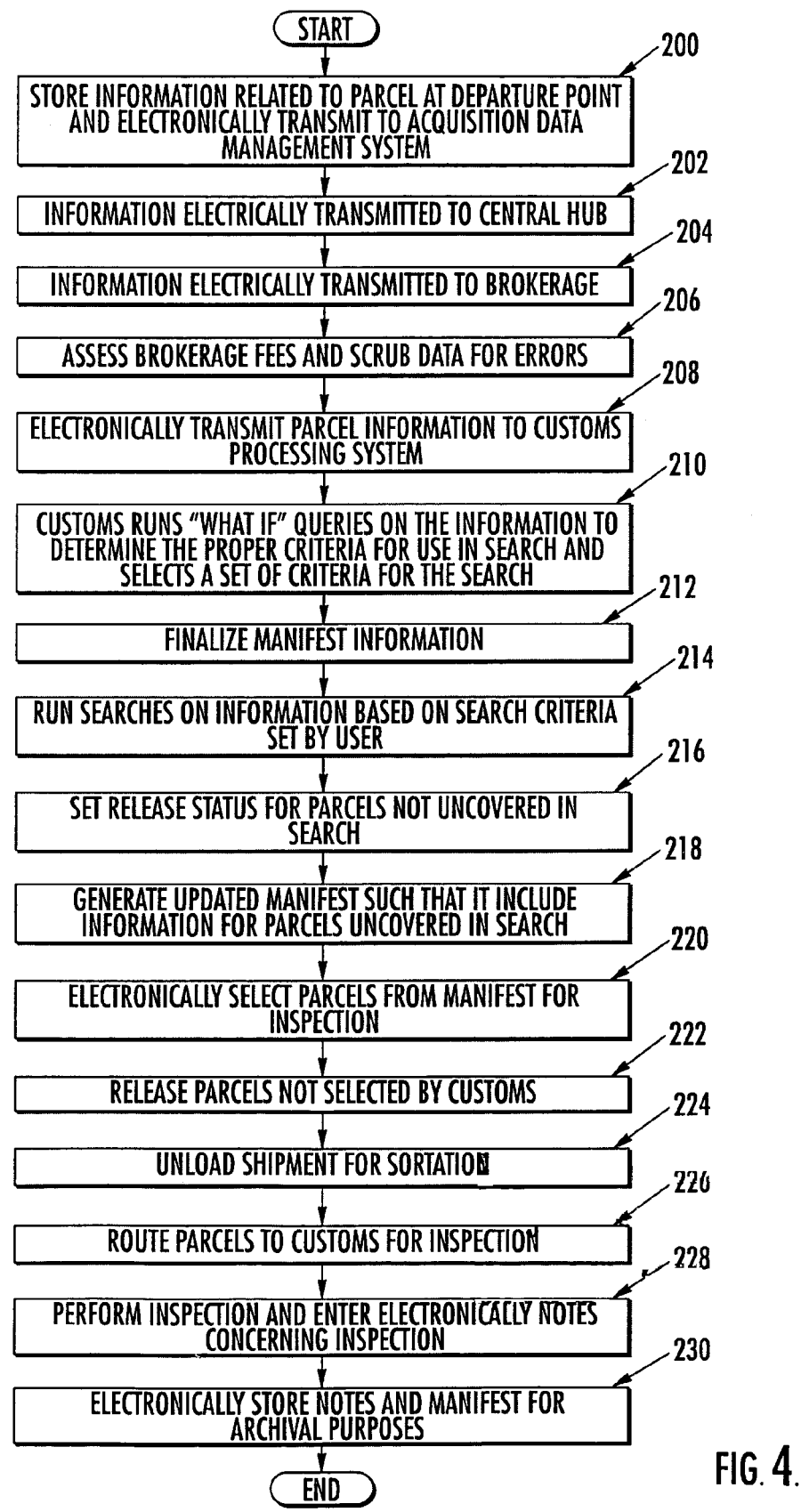
FIG. 4 is a generalized block diagram of the operations used for processing foreign origin parcels according to one embodiment of the present invention.

FIG. 3 is a general illustration of one embodiment of the systems and methods of the present invention. FIG. 3 illustrates in block diagram form, the general flow of foreign origin parcels through a parcel delivery system. Further, FIG. 4 illustrates the operational steps performed by the systems and methods of one embodiment of the present invention. Specifically, shipments containing parcels/packages are first provided to a parcel delivery service at a drop off location 50. Information 52 concerning the shipment and parcels in the shipment is stored electronically and transmitted through the parcel delivery system along with the shipment and parcels. (See step 200). Specifically, the information for the shipment and individual parcels in the shipment is communicated to an acquisition data management system 54, which is either an independent data system or an integral part of a larger parcel delivery system. The shipment is also shipped to a local hub 56 for processing. The shipment is loaded onto a transport, such as an aircraft or ship, for transport to a central hub 58. In the case of imports, the central hub is a central processing point for the shipment prior to delivery in the country where the hub is located. In the case, of in-transit shipments, the central hub is an intermediate processing facility in a third country between the departure and delivery countries.

In an effort to minimize delay in processing of foreign origin parcels, information 60 corresponding to shipments and individual parcels in the shipment is transmitted to the central hub 58 ahead of the actual shipment. (See step 202). This information is typically referred to as a forecast manifest and consists of information for each shipment and parcels in the shipment that are forecasted to be transferred to the hub. The central hub 58 has an associated parcel data management system 62 for handling the overall processing of shipments. The forecast/manifest is electronically transmitted to the parcel data management system 62. Associated with the information for each shipment is a status flag. This status flag is an indication to the parcel data management system of the current status of the shipment in terms of whether it is ready for delivery. As import parcels are subject to duties and other taxes and both import and in-transit parcels are subject to Customs laws, the status for shipments is initially set to "hold." The shipments are not available for delivery until their status is updated to "release."

With reference to FIG. 3, within the central hub 58 is a broker division 64. This division includes a number of brokers who analyze information associated with import shipments through a rating process and assess duties and other taxes for each of the parcels in a shipment. The broker division 64 may have a broker management system 66 that is either independent of or a subset of the parcel data management system 62. Information 68 for parcels in the forecast/manifest 60 that are imports are provided to the broker management system 66. (See step 204). In the broker management system, several of the parcels fall within specified categories in terms of weight, size, cost, etc. that allow them to be processed in an automated manner. However, other import parcels must be reviewed by brokers and rated for the level of duty and other taxes to be paid on the import parcels. The brokerage division may hold shipments containing parcels that require additional information for rating or for other brokerage reasons. This is referred to as a "broker hold."

After brokerage processing is complete, the forecast/manifest 60 is provided to Customs via a Customs processing system 70, one embodiment of which is referred to by the Assignee of the present application as the Target Search™ system. This system provides several features that allow for faster, more efficient processing, and improved accuracy in the inspection of parcels through Customs. Specifically, with reference to FIG. 3, the Customs processing system 70 of the present invention includes a processor 72 and a database 74. Further, the system includes either one or several interface devices 76. The interface devices can either be terminals or handheld wireless devices. The interface devices include displays and some form of data entry system, such as a keyboard, keypad, touch-screen, etc.

With reference to FIG. 3, the Customs processing system 70 further includes a software program or set of commands 78 associated with the processor 72. The program can be stored in the database 74 or another storage device. The program is an aid in the inspection of parcels for Customs. The program performs several functions that will be discussed in greater detail below, including providing visual representations of the information associated with parcels to a user via the interface, allowing the user to input and interact with the information, store additional information with the data, and sort, capture screen shots, and run reports on the data. Importantly, the software program also includes a search engine 80 as part of its instruction code. The search engine 80 allows users to electronically search information for parcels based on selected criteria. This allows the user to identify shipments and individual parcels in shipments for inspection.

With reference to FIG. 3, after the broker division has processed the shipment with import parcels, the information for the import and in-transit parcels is ready for Customs to analyze. In particular, brokerage typically processes all of the import parcels. The brokerage system can place a brokerage hold on a parcel. This is typically done for parcels that lack sufficient information for determining duties and other taxes. Further, the system of the present invention further includes a data scrubber 82. The data scrubber is typically a search engine in the form of a computer program, instruction code, or hardware and may be part of the Customs processing system. The data scrubber evaluates the information associated with either all of the import parcels handled by brokerage, a random sample of the parcels, or some selected combination. The data scrubber searches for mistakes or other problems in the information that may have been caused by brokerage or when the parcel was initially entered into the system at the drop off point. (See step 206). Mistakes found in the information is reviewed and corrected by brokerage personnel. The information added to the parcels by brokerage is illustrated in the brokerage information section of Table 1 below, and is also discussed below.

With reference to FIG. 3, after brokerage and the data scrubber have finished with the import information, the forecast/manifest 60 is transferred to the Customs processing system 70 for determination of which parcels of which shipments will be inspected when they arrive. (See step 208). The decision concerning which parcels will be inspected by Customs is based on a number of factors chosen by Customs. Specifically, shipments bound for a particular destination or from particular departure locations may be more susceptible to inspection, or instead, maybe it is the sender or receiver or the value of the parcels in a shipment that raises issues for possible inspection. Table 1 below lists the various informational items that are typically associated with each parcel. Any one or a combination of these information items may be used by inspectors to select parcels for Customs inspection.

TABLE 1

| | |
|---|---|
| Shipper Info | Shipper Number |
| | Export Country (Shipper) |
| | Export Port code |
| | Shipper Name |
| | Shipper Address |
| | Shipper City |
| | Shipper Postal Code |
| Importer Info | Destination Country |
| | Import Port code |
| | Importer Name |
| | Destination Address |
| | Destination City |
| | Destination State |
| | Destination Postal Code |
| Package Info | Tracking Number |
| | Package Weight |
| | Total Shipment Weight |
| | Value |
| | Description (Invoice Line Detail) |
| | Multiple Indicator |
| | MAWB Number |
| | Import Date |
| Brokerage Info | Customs Entry Number |
| | Shipment ID |
| | Import Port (4196) |
| | Entry Type (10,02,03,11,20) |
| | Paperless Indicator |
| | Broker Hold Status |
| | Entry Class (sec,inf,fml,int . . .) |
| | Tariff Number |
| | Country of Origin (merchandise) |

As discussed, the Customs processing system 70 includes a processor 72 and search engine 80 that allow the user to electronically filter through the information associated with each parcel and select parcels for inspection. Importantly, the search engine 80 of the present invention allows the user to select one or several of the information fields Table 1 for use in the search.

As illustrated above, after brokerage has processed and scrubbed the import data, the forecast/manifest is forwarded to the Customs processing system 70. Prior to sorting the shipment, Customs must select the final criteria that will be used by the search engine 80 to filter through the shipments, (i.e., what fields from Table 1 will be used for selecting parcels for inspection). To aid in this selection process, the Customs processing system 70, (referred to as Target Search™ by the Assignee of the application), allows the user to perform "what if" scenario queries on the information of the shipment listed in the forecast/manifest prior to the actual unloading of the shipments. (See step 210). Using these "what if" scenarios, the user can determine how many shipments that the search engine will likely locate based on the selected filters. If the filter criteria are set too broad, too many shipments may be uncovered by the search engine or too few, if the criteria are set too narrow.

It is noted here, that the "what if" scenarios are ran on the actual information for the parcels. It must be understood that typically when the "what if" scenarios are ran by the user, not all of the information for all parcels may yet be available. Specifically, during this process, the aircraft or other vehicle located at the local departure hub 56 may still be in the process of being loaded. Shipments currently slated in the forecast for shipment to the central hub may be rerouted to other central hubs, and other previously non-forecasted shipments may be reslated to send to the central hub. For this reason, updated forecast/manifest may be periodically transmitted between the acquisition data management system 54 and the parcel management system 62. However, in general terms, a large percentage of the information in the forecast/manifest is accurate and is enough to allow the user to select proper filter criteria in the "what if" stage.

FIG. 5 is a screen shot depiction of the query window supplied by the processor 72 of the present invention to an interface 76 as shown in FIG. 3. Using this interface, the user can select the criteria from Table 1 for search. Listed below are several examples in text form illustrating types of queries that can be selected.

| | |
|---|---|
| Example 1: | export country = TH |
| | dest postal code = 100** |
| | ship type = all, except formals |
| Example 2 | export country = CA |
| | dest country = CO |
| | ship type = letter |
| Example 3 | export country = TW |
| | description = toy |
| | dest country = US |
| Example 4 | dest country = US |
| | Ship type = section 321 |
| | weight = >20 lbs |
| | multiple indicator = >1 |
| Example 5 | dest country = US |
| | value = >$100,000 |
| Example 6 | export country = CO, TH |
| | destination country = US |
| | shipper number = X** |
| Example 7 | destination country = US |
| | value = >$200.49 |
| | shipment type = section 321 |
| Example 8 | destination country = US |
| | tariff number = 8542****** |
| | entry type = 01, 11 |
| Example 9 | destination country = US |
| | country of origin = HK, TW, CN |
| | description = *sample" |
| | shipment type = section 321, informal |
| Example 10 | destination country = US |
| | value = >$2000.49 |
| | entry type = 11 |

With reference to FIG. 5, in this particular example, the user has selected the following query:

| | |
|---|---|
| Query | export country = CA |
| | dest country = US |
| | dest state = Kentucky |
| | entry class = informals |

FIG. 6 is a screen shot illustration of data returned by the search engine for this query. As can be seen from the figure, the search criteria selected by the user resulted in five shipments. As can be seen, by using this process, the user can select proper search criteria in the test mode to be used by the search engine 80 when the shipments arrive. (See step 210).

It is important to note here that in most instances, there will be several different users of the system at a given time. Specifically, there will be several Customs inspectors that will each wish to select their own search criteria for shipments. In these instances, each user has an associated unique identification code. The search criteria for each user are saved along with their identification code. As such, the search engine will run different searches for each user and save the results for each user under their unique identification code. Furthermore, each user typically has a selected location in the inspection area for performing inspections. This information is also stored with the shipments, once selected, so the shipment can be routed to the correct location.

With reference to FIG. 3, after the information for the import parcels has been processed through brokerage and the users, (i.e., Customs inspectors), have set their filters or search criteria and the shipments have arrived, the forecast/manifest is finalized. (See step 212). Note that the manifest may be finalized once the aircraft has left the local hub 56, and before the shipments arrive. The system may also update the forecast/manifest if shipments are diverted to other central hubs for processing.

Once brokerage has completed processing of the packages and the forecast/manifest has been finalized, the custom processing system of the present invention, via the search engine 80, runs the various searches previously selected by the users. (See step 214). Importantly, after running the searches, the Customs inspection system alters the status flag associated with all shipments not selected in the searches to "release." (See step 216). As such, all shipments not selected are immediately released thereby expediting sortation and delivery of these shipments.

With reference to FIG. 7, following the searches ran by the search engine 80, an updated electronic manifest is generated for each user. (See step 218). The manifest includes information about shipments uncovered in the search and information about each parcel in the shipment. As can be seen from this figure, the Customs processing system of the present invention provides the user with several options for selection of shipments and parcels within the shipment from the manifest for inspection. Specifically, as illustrated at the top right of the screen 86, the user can request that the system select a random number of shipments for inspection or to choose every nth shipment for inspection. Further, as illustrated along the left side of the screen 84, the user can manually select shipments for inspection. (See step 220).

After these selections have been made, the Customs processing system 70 of the present invention first changes the status flag of all shipments that do not have parcels selected for inspection to "release," thereby allowing the shipments uncovered by the search engine but not selected for inspection to be sorted for delivery. (See step 222).

With reference to FIG. 4, after the users have selected parcels for inspection, the shipments can now be unloaded for sortation and delivery at the central hub. (See step 224). To facilitate rapid and accurate sortation of the parcels, the central hub includes an at least partially automated sorting system 88. This system includes conveyors, chutes, optical scanners, and other processing machinery. The sorting system reads information concerning the parcels that is stored in bar codes on the parcel and it also uses the information stored in the parcel delivery system 62. Based on the data, the sorting system sorts and processes for delivery those shipments having a "release" status flag. For shipments having a "hold" status, the sorting system also accesses information stored in the shipment delivery system concerning where the shipment is to be routed in the central hub. For example, if the shipment is a broker hold, the sorting system will route the shipment to brokerage. If the shipment is on "hold" for inspection, the sorting system will access information associated with the shipment that indicates the identification and location of the user that selected the parcel from the shipment for inspection. (This information is typically stored with the information for the parcels and shipment during the parcel selection process.). Using the location information associated with the selected parcels, the sorting system 88 routes either the entire shipment or only the selected parcels from the shipment to the user's, (i.e., Customs inspector), location for inspection. (See step 226). In most instances, the selected parcels from a shipment are provided to the user, while the remaining parcels of the shipment are stored in a holding area until the selected parcels are inspected.

As mentioned above, shipments are not provided to the Customs processing system until brokerage has completed brokerage assessment of the shipments. An important aspect of the present invention is that the system allows information concerning shipments completed in brokerage to be provided to the Customs processing system at any time in the inspection process. Specifically, in the conventional systems, which used paper manifest, if a shipment was delayed in brokerage and was not released prior to presenting the paper manifest to Customs, the delayed shipment could not be processed through Customs until the next day.

The present invention, however, allows the Customs processing system to be updated throughout the inspection process with data concerning shipments that clear brokerage after Customs inspection has began. Specifically, as shipments clear brokerage, the data concerning these shipments is down loaded into the Customs processing system. The data is searched by the search engine using the search criteria. These later added shipments are then processed as discussed above in the Customs processing system. Specifically, after Customs has finished inspection of a first batch of shipments, the Customs agent may then review a new electronic manifest of shipments most recently clearing brokerage so that these shipments can also be inspected. As such, an ongoing process may be provided for processing shipments as they are cleared by brokerage.

The system thus allows more flexibility and typically less delay, as it allows brokerage to continue work on shipments, while other shipments previously released from brokerage are being inspected or sorted for delivery. As such, brokerage has more time to inspect shipments and correct errors with less concern in delaying delivery of the shipment.

When the selected parcels arrive at the inspection location, the user, via an interface 76, which could be a terminal or hand-held scanner, accesses the information concerning the parcels selected for inspection. During the inspection, the user may make notes concerning the parcels. (See step 228).

These notes are made electronically via the interface and are stored in data fields, not shown, associated with the parcels. These notes and the manifest are stored electronically for archival purposes. (See step 230). As can be seen along the right side 84 of the display, the user may also select different options for the parcel during the inspection. For example, the user may choose to have the parcel x-rayed, canine inspected, or reject the parcel. Further, after the inspection is complete, the user may hold, confiscate, or release the parcel. If the shipment is "released," it is placed back in the sorting system 88 to be sorted and processed for delivery. If a shipment or a parcel from a shipment is held or confiscated, they may be warehoused at another location in the hub or offsite. In these instances, these shipments or parcels may be placed back in the sorting system 88 and the sorting system may route them to the designated area for warehousing.

It is noted here that the parcel may be inspected at different levels of inspection, from hand inspection, x-ray inspection, to canine inspection. There may be a certain hierarchy in inspectors, such that even though x-ray and canine inspection has released a parcel, the parcel cannot be finally released for shipping until released by the Customs inspector in charge of the parcel. In light of this, in instances where x-ray, canine, or other lower level inspections are performed, the customs processing system allows for secondary release of the parcel by these lower level inspection areas, but maintains a higher level status for the parcel that dictates when the parcel has cleared inspection for delivery.

As illustrated above, the present invention provides systems and methods for processing foreign origin parcels through a parcel delivery system. Importantly, the systems and methods of the present invention allow a user or users to perform electronic searches of the information associated with the parcels. From these searches, the user is provided with a list of shipments meeting the search criteria. The user can view these results electronically and make selection of parcels within the shipments for further inspection. During inspection the user can store electronically notes concerning the inspection and electronically hold, release, or confiscate the parcel.

Importantly, the systems and methods of the present invention create electronic records of the inspection process. These records can be used to document the inspection and run reports. For example, typically, the systems and methods of the present invention will stored a copy of the manifest as originally presented to the user from the search engine as this illustrates the parcels that the user had available for selection. Further, the systems and methods of the present invention typically also save an electronic copy of the manifest used by the user during inspection. This manifest includes any notes made by the inspector. The electronic records for the inspection are archived in a database and retained for a period of time of typically five years or more. These electronic records are considered proof of the inspection. Specifically, the results from the search provide proof of presentation to Customs of the parcels, and the electronically edited manifest during inspection is proof of approval by Customs. Given the fact that most of the records are stored electronically and may be subject to alteration, the systems and methods of the present invention provide security safeguards that deny either access or editing to the records. Further, it is generally understood that the search criteria used by the Customs inspectors are sensitive in nature and should be restricted from public disclosure. As such, the systems and methods of the present invention also have security associated with the search criteria selections of the users.

The systems and methods of the present invention also provide additional features not previously mentioned. Specifically, with reference to FIG. 7, the Customs processing system of the present invention provides additional information to the user. For example, it illustrates the number of parcels/packages in a shipment. This is useful information during the selection process, as a shipment having several individual parcels may require increased time for inspection.

Although not shown, the systems and methods of the present invention may also provide an information display for use by management. Specifically, the display may include information concerning each user, the location where the user is performing inspections, and the number parcels selected for inspection and/or the number left or already inspected.

The systems and methods of the present invention may also allow the user to download information concerning parcels. This is an extract capability that allows a user to extract data from the system for use in other programs. The other programs may be spread sheets, databases, or other tools that can be used for analyzing, archiving, and/or generating reports on the data.

For example, there are certain parcels that are processed through the automated brokerage interface (ABI). These parcels are formals that typically do not require brokerage interaction. However, there are limits above which Customs must approve the parcels before they are released for shipment. In these instances, information for parcels that are above the limits is downloaded by Customs and processed by Customs using their own software programs.

The present invention also provides systems and methods for inspecting export shipments. Specifically, as mentioned above, when a shipment is provided to a parcel delivery service for shipment, several items of information concerning the shipment is entered electronically. This information may, for example, include the departure and destination, the sender, the receiver, the type of goods in the shipment, i.e., agriculture products, encrypted data, etc. Importantly, the systems and methods of the present invention allow a user to perform electronic searches on the export data using selected search criteria. Export shipments uncovered from the search can then be viewed electronically by the user. The user can electronically select export shipments and individual parcels in the shipments for further inspection, confiscation, etc. The user can also store electronic notes concerning the inspection.

More specifically, as illustrated in FIG. 4, when shipments containing parcels/packages are first provided to a parcel delivery service at a drop off location 50, information 52 concerning the shipment and parcels in the shipment is stored electronically and provided to an export processing system. As mentioned, this information may include many different types of data from the sender's information, the receiver's information, the destination, the type of goods contained in the shipment, ect. In the present invention, this information is made available to the system of the present invention. Similar to the Customs example above, user's concerned with exports can select search criteria to be ran on the various shipments that in the process of being exported. Based on this search criteria, the search engine 80 searches the data associated with the various shipments and displays the results electronically to the user. Using the interface device 76, the user can select export shipments that either need to be held, inspected, confiscated.

Typically, all of the export have a hold status until they are released by the export personnel. As such, those exports not meeting the search criteria as determined by the search engine are released, while those selected by the search engine are held. Further, after the user makes their selections from the shipments uncovered during the search, the unselected shipments are also released. The released shipments are prepared for shipping, while the held or confiscated export shipments are routed either to an inspector or to a warehouse storage area.

As with the previously described system, the system of the present embodiment also allows the user to make electronic notations via the interface device 76 concerning inspections. These electronic notes can be archived, search, and otherwise used for subsequent reports. As such, the present invention not only provides systems and methods for use in the inspection of import shipments, these same concepts can also be applied to exports.

In addition to providing systems and methods for processing of foreign origin and export parcels, the present invention also provides systems and methods for use in general security systems. Specifically, there has been a recent increase in security in the transportation industry, as well as for major sporting and entertainment events. Currently, security must perform assessments of passengers or attendees prior to either boarding an aircraft or entrance into a secured area. These assessments may be aided by stored information related to the individual, but is more likely based on an in-person evaluation of each person. As with other forms of hand search methods, there is potential for human error. The present invention provides systems and methods that allow security to perform electronic searches on data stored for passengers and attendees. Based on these searches, security can select individuals who should be further scrutinized prior to either boarding an aircraft or entrance to a secured area.

For example, when an individual purchases a plane ticket, there are several items of information electronically stored concerning the purchase. This information includes the passenger's name, the date the ticket was purchased, the departure and destination, the price of the ticket, the planned length of the trip, etc. Further, more information could be added, such as the passenger's nationality, the frequency with which the person flies, whether someone other than the passenger bought the ticket, etc. This data may be helpful in assessing whether the passenger should be further scrutinized. For example, if the passenger has planned a trip having a short duration or is flying from a particular departure location to a particular destination, these passengers may require increased scrutiny.

As such, in some embodiments, the present invention provides systems and methods that allow for electronic search and evaluation of passengers and attendees. Specifically, information concerning the individuals is stored electronically into a database. The systems of this embodiment, (similar to those discussed above), allow security personnel to run electronic searches on this stored information. The security personnel inputs search filter criteria that define the type of information they are interested in accessing. Prior to boarding or opening of an event, security runs an electronic search of the data using the search filters. Individuals uncovered by the search and their stored information is displayed to security personnel in the form of a manifest. Security personnel can then electronically select individuals from the manifest for further security inspection. Similar to the Customs scenario above, all individuals could first have a status of hold meaning that they are not allowed to board the aircraft or enter the event. After the search and selection process, individuals not selected for further search have a release status, while those selected for further inspection retain the hold status.

This status information is then provided to the system for access by various security personnel. For example, in an airline setting, the status information concerning passengers can be provided to security at check-in, security at the metal detector stations, and at the boarding gate. When a passenger checks-in for their flight, the security personnel will note whether the passenger has been released for boarding or whether the passenger should be directed to security for further investigation.

During the investigation process, security may have electronic access to the manifest, which displays all of the passenger's information. The systems and methods of the present invention may allow the security personnel during the investigation to make notes concerning the investigation. These notes are made electronically via the interface and are stored in data fields associated with the passengers other information. These notes and the manifest are stored electronically for archival purposes and for generation of reports.

During the investigation process, security may decide to release the passenger allowing the passenger to board the aircraft or they may alternatively, continue to hold the passenger. When a passenger's status has been altered to release, this information is provided in the system to all security, which, in turn, will allow the passenger to board the aircraft. Importantly, the system requires that each passenger be subjected to security inspection prior to release. Some passengers are released because their information does not meet the filter criteria for the search, while those meeting these search criteria are not released until security personnel are satisfied. As such, increased security is provided by allowing electronic search of information and archival of notes associated with passenger investigation.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system located at a central hub facility for routing parcels to a location within the central hub facility for inspection, the system comprising:
   a customs processing computer system comprising:
   at least one processor configured, prior to a plurality of parcels arriving at the central hub, to:
   (a) receive search criteria defined by a user, the search criteria to be used to identify parcels that satisfy the search criteria;
   (b) store the search criteria;
   (c) access data records associated with the plurality of parcels from memory located at the central hub facility, each of the data records comprising status information related to each parcel, the status information indicating a hold status;
   (d) use the search criteria to search the data records to identify a set of search results comprising each parcel of the plurality of parcels that satisfies the search criteria;
   (e) display the set of search results to the user; and
   (f) receive a selection of one or more particular parcels identified in the set of search results by the user for inspection; and
   (g) alter the hold status in each data record associated with parcels not selected by the user to a release status; and the at least one processor configured, in response to the plurality of parcels arriving at the central hub, to:
- (a) access the data records associated with the plurality of parcels from the memory located at the central hub facility;
- (b) route the one or more particular parcels that have the hold status to the inspection location; and
- (c) route for delivery any of the plurality of parcels that have the release status.

2. A system according to claim 1, wherein said at least one processor is configured to create a list of the parcels selected by the user, said list comprising information associated with each selected parcel from the data record for the parcel to thereby provide a manifest of the parcels selected for inspection.

3. A system according to claim 1, wherein the at least one processor is configured to provide the user with the status information for each parcel selected for inspection and to allow the user to alter the hold status of the parcel following inspection.

4. A system according to claim 1, wherein said at least one processor is configured to allow the user to enter inspection information concerning parcels inspected by the user and to store the inspection information in the memory located at the central hub facility to thereby provide a record of the inspection of a parcel.

5. A system according to claim 4, wherein said at least one processor is configured to retrieve stored inspection information for generation of reports related to the inspection.

6. A system according to claim 1, wherein said at least one processor is configured to perform preliminary tests on information associated with data records for the plurality of parcels by:
- receiving different search criteria defined by the user in a test mode;
- searching the data records utilizing the search criteria to identify a set of search results that comprises each parcel of said plurality of parcels that satisfies the search criteria; and
- displaying the set of search results to the user.

7. A system according to claim 6, wherein said at least one processor is configured to store resulting desired search criteria determined during the test mode in the memory for use in normal operation to search the data records.

8. A system according to claim 1, wherein there is a plurality of possible users each having an unique identification code, and said at least one processor is configured to receive individual search criteria defined by each user and to store the search criteria along with the user's identification code.

9. A system according to claim 8, wherein said at least one processor is configured to search the data records using the search criteria selected by each user to identify a set of search results that comprises each parcel of said plurality of parcels that satisfies the search criteria and to store each set of search results along with the user's identification code.

10. A system according to claim 9, wherein said at least one processor is configured to access the set of search results associated with a user's identification code and to receive a selection of one or more particular parcels from the set of search results from the user for inspection.

11. A system according to claim 10, wherein said at least one processor is configured to create a manifest for each set of search results for each user containing a list of the parcels selected by the user and information associated with each selected parcel to thereby provide a manifest for each user of the parcels selected for inspection by the user.

12. A system according to claim 11, wherein said at least one processor is configured to update the manifest associated with a user's identification code during inspection to indicate which of the selected parcels on the manifest have been inspected by the user.

13. A system according to claim 12, wherein said at least one processor is configured to use the manifest associated with each user to construct a report displaying each user and the number of parcels selected for inspection by each user.

14. A system for processing export parcels at a central hub comprising:
- an acquisition data management computer system comprising at least one computer, the computer being configured for receiving and storing data records related to a plurality of export parcels prior to the plurality of export parcels arriving at the central hub facility; and
- an export processing computer system comprising at least one processor for routing parcels to a location at the central hub facility for inspection, the at least one processor being configured, prior to the plurality of parcels arriving at the central hub facility, for:
  - (a) receiving search criteria defined by a user, the search criteria to be used to identify parcels that satisfy the search criteria;
  - (b) storing the search criteria;
  - (c) accessing the data records associated with the plurality of parcels from said acquisition data management system, each of the data records comprising status information associated with each parcel, the status information indicating a hold status;
  - (d) searching the data records using the search criteria to identify a set of search results comprising each parcel of the plurality of parcels that satisfies the search criteria;
  - (e) displaying the set of search results to the user; and
  - (f) receiving a selection of one or more particular parcels identified in the set of search results by the user for inspection; and
  - (g) altering the hold status in each data record associated with parcels not selected by the user to a release status in the acquisition data management computer system; and
the at least one processor being configured, in response to the plurality of parcels arriving at the central hub, for:
- (a) accessing the data records associated with the plurality of parcels from the acquisition data management system;
- (b) routing the one or more particular parcels that have the hold status to an inspection location; and
- (c) routing for delivery any of the plurality of parcels that have the release status.

15. A method for routing a plurality of parcels received at a central hub facility to a location within the central hub facility for inspection, the method comprising the steps of:
- (a) prior to the plurality of parcels arriving at the central hub facility:
  - (1) receiving search criteria in a customs processing computer system comprising at least one processor, the search criteria to be used to identify parcels that satisfy the search criteria;
  - (2) storing the search criteria;
  - (3) accessing, by the at least one processor, data records associated with the plurality of parcels transmitted over a network to the central hub facility and stored in memory, each of said data records comprising status information associated with each parcel, the status information indicating a hold status;
  - (4) searching the data records by the at least one processor using the search criteria to identify a set of search results comprising each parcel of the plurality of parcels that satisfies the search criteria;

(5) displaying to a user the set of search results; and (6) receiving a selection of parcels that comprises one or more particular parcels identified in the set of search results by the user for inspection; and (7) altering the hold status in each data record associated with parcels not selected by the user to a release status; and (b) in response to the plurality of parcels arriving at the central hub facility:

(1) accessing, by the at least one processor, the data records associated with the plurality of parcels from the memory;

(2) routing, by the at least one processor, the one or more particular parcels that have the hold status to the inspection location; and (3) releasing, by the at least one processor, for delivery any of said plurality of parcels that have the release status.

16. A method according to claim 15 further comprising the step of creating a list of the parcels selected by the user and information associated with each selected parcel by the at least one processor from the data records associated with the plurality of parcels stored in the memory to thereby provide a manifest of the parcels selected for inspection.

17. A method according to claim 16 further comprising the step of displaying the manifest to the user.

18. A method according to claim 16 further comprising the step of altering the hold status of the parcel on the manifest by the at least one processor following inspection.

19. A method according to claim 15 further comprising the steps of:

entering inspection information concerning parcels inspected by the user; and storing the information in the memory to thereby provide a record of the inspection of a parcel.

20. A method according to claim 19 further comprising the step of retrieving stored inspection information concerning parcels inspected from the memory for generation of reports related to the inspection.

21. A method according to claim 15, wherein said step of receiving search criteria comprises the user performing preliminary tests on the data records for the plurality of parcels by receiving different search criteria defined by a user in a test mode, and wherein said step of searching the data records comprises using the different search criteria.

22. A method according to claim 21 further comprising the step of storing resulting desired search criteria in the memory determined during the test mode for use.

23. A method according to claim 15, wherein there is a plurality of possible users each having an unique identification code, and wherein said step of receiving search criteria comprises receiving from each user individual search criteria and said step of storing the search criteria comprises storing the individual search criteria along with the user's identification code.

24. A method according to claim 23, wherein said step of searching the data records comprises searching the data records using the individual search criteria defined by each user and said method further comprises the step of storing a set of search results in the memory that comprises each parcel of said plurality of parcels that satisfies the individual search criteria of each user along with the user's identification code.

25. A method according to claim 24, wherein said step of receiving a selection of parcels comprises receiving a selection of one or more particular parcels selected by the user from the set of search results stored in memory identified by the user's identification code for inspection.

26. A method according to claim 25 further comprising the step of creating a manifest by the at least one processor for each set of search results containing a list of the parcels selected by the user and the information associated with each selected parcel to thereby provide a manifest for each user of the parcels selected for inspection by the user.

27. A method according to claim 26, wherein the inspection location comprises inspection locations associated with each user and said step of routing the one or more particular parcels to the inspection location comprises the at least one processor using the manifest to route parcels selected by the user to the user's inspection location based on the user's identification code.

28. A method according to claim 26 further comprising the step of updating the manifest associated with the user's identification code during inspection to indicate which of the selected parcels on the manifest have been inspected.

29. A method according to claim 28 further comprising the step of displaying a report of each user and the number of parcels selected for inspection by each user.

30. A system for use in evaluating individuals prior to entrance into a secure environment, said system comprising:

a processing computer system comprising:

at least one processor configured, prior to a plurality of individuals arriving at an entrance to the secure environment located at a facility, to:

(a) receive search criteria defined by a user, the search criteria to be used to identify individuals that satisfy the search criteria; and (b) store the search criteria;

(c) access data records associated with the plurality of individuals attempting to gain access to the secure environment from memory, each of said data records comprising status information, the status information indicating a hold status;

(d) search the data records using the search criteria to identify a set of search results comprising each individual of the plurality of individuals that satisfies the search criteria;

(e) display the set of search results to the user;

(f) receive a selection of one or more particular individuals identified in the set of search results by the user for further investigation; and (g) alter the hold status in each data record associated with parcels not selected by the user to a release status; and the at least one processor configured, in response to the plurality of individuals arriving at the entrance of the secure environment, to:

(a) access the data records associated with the plurality of individuals from the memory;

(b) instruct the one or more particular individuals that have the hold status to be routed an investigation location; and (c) instruct any of said plurality of individuals that have the release status to be routed to the secure environment.

31. A system according to claim 30, wherein said at least one processor is configured to create a list of the individuals selected by the user and information associated with each selected individual from the data record for the individual to thereby provide a manifest of the individuals selected for investigation.

32. A system according to claim 30, wherein said at least one processor is configured to receive information entered by the user concerning individuals investigated by the user and to store the information in the memory to thereby provide a record of the investigation.

33. A system according to claim 30, wherein there is a plurality of possible users each having a unique identification code, and wherein said at least one processor is configured to receive individual search criteria defined by each user and to store the search criteria along with the user's identification code.

* * * * *